(12) United States Patent
Hong et al.

(10) Patent No.: US 12,374,754 B2
(45) Date of Patent: Jul. 29, 2025

(54) SEPARATOR FOR SECONDARY BATTERY AND LITHIUM SECONDARY BATTERY COMPRISING SAME

(71) Applicant: SAMSUNG SDI CO., LTD., Yongin-si (KR)

(72) Inventors: Daehyun Hong, Suwon-si (KR); Dowon Kim, Suwon-si (KR); Imhyuck Bae, Suwon-si (KR); Hyunwook Jung, Suwon-si (KR); Jaehyun Cho, Suwon-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 674 days.

(21) Appl. No.: 17/619,416

(22) PCT Filed: Nov. 12, 2019

(86) PCT No.: PCT/KR2019/015343
§ 371 (c)(1),
(2) Date: Dec. 15, 2021

(87) PCT Pub. No.: WO2021/002541
PCT Pub. Date: Jan. 7, 2021

(65) Prior Publication Data
US 2022/0328929 A1    Oct. 13, 2022

(30) Foreign Application Priority Data

Jul. 4, 2019   (KR) .................. 10-2019-0080832

(51) Int. Cl.
*H01M 50/426* (2021.01)
*H01M 10/0525* (2010.01)
*H01M 50/434* (2021.01)
*H01M 50/446* (2021.01)
*H01M 50/449* (2021.01)

(52) U.S. Cl.
CPC ....... *H01M 50/426* (2021.01); *H01M 50/434* (2021.01); *H01M 50/446* (2021.01); *H01M 50/449* (2021.01); *H01M 10/0525* (2013.01)

(58) Field of Classification Search
None
See application file for complete search history.

(56) References Cited

U.S. PATENT DOCUMENTS

2012/0268072 A1 * 10/2012 Okuno ................ H01M 50/454 429/94
2012/0301794 A1 * 11/2012 Koh ...................... H01B 1/122 429/302
2014/0242444 A1 * 8/2014 Nishikawa ............ H01M 50/26 429/144
2015/0147627 A1 * 5/2015 Takano ............... H01M 50/449 429/144
2015/0280196 A1   10/2015 Ichisaka et al.
2016/0164060 A1   6/2016 Zhang et al.
2017/0155123 A1 * 6/2017 Hasegawa ............. B32B 27/281
2017/0338460 A1   11/2017 Kim et al.
2019/0013504 A1   1/2019 Choi et al.

FOREIGN PATENT DOCUMENTS

| CN | 104737326 A | 6/2015 |
|---|---|---|
| CN | 105794019 A | 7/2016 |
| CN | 107210411 A | 9/2017 |
| CN | 107394090 A | 11/2017 |
| CN | 108463904 A | 8/2018 |
| EP | 3070764 A1 | 9/2016 |
| EP | 3404739 A1 | 11/2018 |
| JP | 2018-536971 A | 12/2018 |
| KR | 10-2016-0108116 A | 9/2016 |
| KR | 10-2017-0044074 A | 4/2017 |
| KR | 10-2017-0085825 A | 7/2017 |
| KR | 10-2017-0129452 A | 11/2017 |
| KR | 10-2018-0093831 A | 8/2018 |
| KR | 10-2019-0135262 A | 12/2019 |
| WO | WO 2015/083790 A1 | 6/2015 |
| WO | WO 2017/067948 A1 | 4/2017 |
| WO | WO-2017122908 A1 * | 7/2017 .......... H01M 10/052 |

OTHER PUBLICATIONS

International Search Report dated Apr. 3, 2020 for PCT/KR2019/015343.
Chinese Office Action dated Mar. 2, 2023.
Office Action dated Aug. 31, 2023, of the corresponding Chinese Patent Application No. 201980098180.2.

* cited by examiner

*Primary Examiner* — Anca Eoff
(74) *Attorney, Agent, or Firm* — Lee IP Law, P.C.

(57) ABSTRACT

Provided is a separator for a secondary battery including a porous substrate and a coating layer disposed on at least one surface of the porous substrate. The coating layer includes a first fluorine-based binder including a vinylidene fluoride (VDF)-derived unit and a hexafluoropropylene (HFP)-derived unit, and a second fluorine-based binder including vinylidene fluoride (VDF)-derived unit and a tetrafluoroethylene (TFE)-derived unit, the hexafluoropropylene (HFP)-derived unit is included in an amount of less than or equal to 5 mol % based on 100 mol % of the first fluorine-based binder, the tetrafluoroethylene (TFE)-derived unit is included in an amount of greater than 10 mol % and less than or equal to 40 mol % based on 100 mol % of the second fluorine-based binder.

7 Claims, 1 Drawing Sheet

【Figure 1】
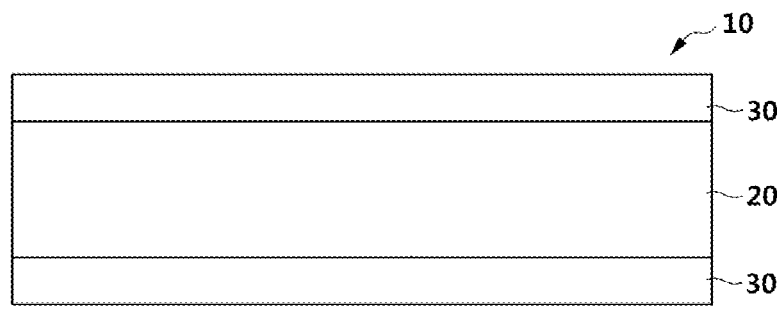
【Figure 2】
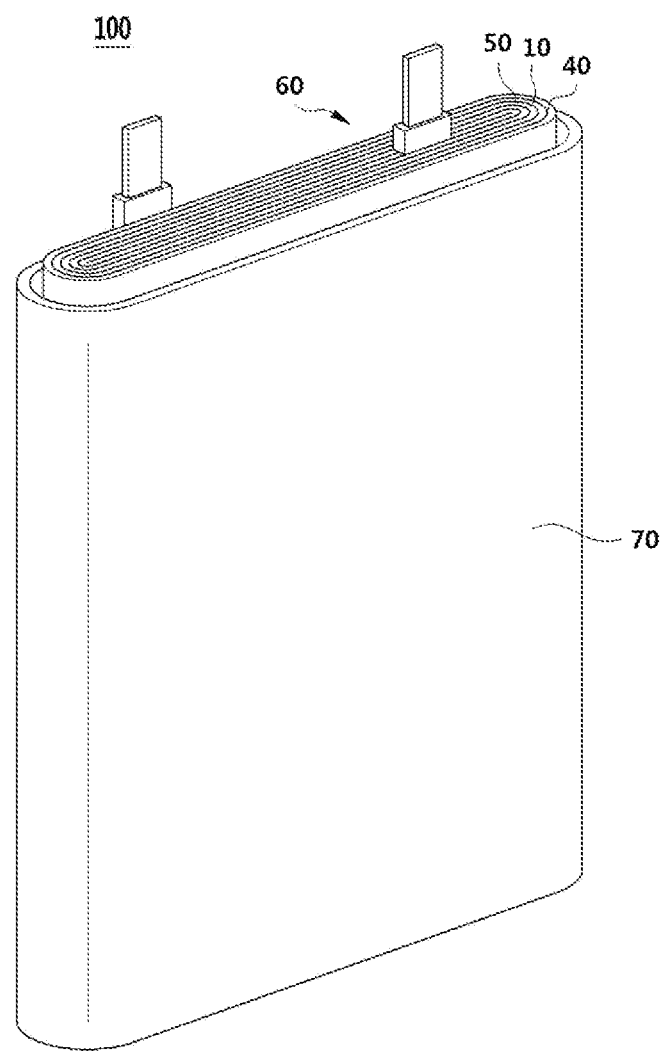

SEPARATOR FOR SECONDARY BATTERY AND LITHIUM SECONDARY BATTERY COMPRISING SAME

CROSS REFERENCE TO RELATED APPLICATIONS

This is the U.S. national phase application based on PCT Application No. PCT/KR2019/015343, filed Nov. 12, 2019, which is based on Korean Patent Application No. 10/2019-0080832, filed Jul. 4, 2019, the entire contents of all of which are hereby incorporated by reference.

TECHNICAL FIELD

A separator for a secondary battery and a lithium secondary battery including the same are disclosed.

BACKGROUND ART

A non-aqueous lithium secondary battery includes a separator made of a porous insulating film and disposed between positive and negative electrodes, and the pores of the film are impregnated by an electrolyte including a lithium salt dissolved therein. The non-aqueous lithium secondary battery has excellent high capacity and high energy density characteristics.

However, when the positive and negative electrodes therein are repetitively contracted and expanded during the charge and discharge cycles or exothermic heat due to abnormal operation of a battery becomes large, battery temperature may be abruptly increased. In this case, a separator may be abruptly contracted or destroyed, short-circuit of electrodes may occur.

Accordingly, a method of securing battery stability by forming a coating layer including heat-resistant inorganic particles and an adhesive binder on at least one surface of the separator has been proposed. However, in order to increase capacity of the lithium secondary battery, a thickness decrease of a separator is accompanied. As the thickness of the separator becomes thinner, the thickness of the coating layer decreases, thereby reducing an adhesion strength between the separator and the electrode plate. When the adhesion strength of the separator is reduced, it may cause a decrease in cycle-life of the battery.

Meanwhile, although an acrylic binder having strong adhesion strength is used as an adhesive binder, the acrylic binder may be swelled sensitively to an electrolyte solution and thus fail to secure a desired level of adhesion strength.

DISCLOSURE

Technical Problem

An embodiment provides a separator for a secondary battery capable of simultaneously securing a high peel strength (that is, a binding force for a substrate) and an adhesion strength to an electrode while thinning the separator.

Another embodiment provides a lithium secondary battery including the separator.

Technical Solution

An embodiment provides a separator for a secondary battery including a porous substrate and a coating layer disposed on at least one surface of the porous substrate, wherein the coating layer includes a first fluorine-based binder including a vinylidene fluoride (VDF)-derived unit and a hexafluoropropylene (HFP)-derived unit, and a second fluorine-based binder including vinylidene fluoride (VDF)-derived unit and a tetrafluoroethylene (TFE)-derived unit, the hexafluoropropylene (HFP)-derived unit is included in an amount of less than or equal to 5 mol % based on 100 mol % of the first fluorine-based binder, and the tetrafluoroethylene (TFE)-derived unit is included in an amount of greater than 10 mol % and less than or equal to 40 mol % based on 100 mol % of the second fluorine-based binder.

Another embodiment provides a lithium secondary battery including a positive electrode, a negative electrode, and a separator for the secondary battery between the positive electrode and the negative electrode.

Advantageous Effects

The separator for a secondary battery secures both binding force for a substrate and adhesion strength to an electrode, so that the lithium secondary battery including the same has excellent properties such as heat resistance, durability, cycle-life characteristics, and stability.

DESCRIPTION OF THE DRAWINGS

FIG. 1 is a cross-sectional view illustrating a separator for a secondary battery according to an embodiment.

FIG. 2 is an exploded perspective view of a lithium secondary battery according to an embodiment.

DESCRIPTION OF SYMBOLS

| | |
|---|---|
| 10: separator | 20: porous substrate |
| 30: coating layer | 40: positive electrode |
| 50: negative electrode | 60: electrode assembly |
| 70: case | |

Best Mode

Hereinafter, embodiments of the present invention are described in detail. However, these embodiments are exemplary, the present invention is not limited thereto and the present invention is defined by the scope of claims.

Hereinafter, a separator for a secondary battery according to an embodiment is described. FIG. 1 is a view illustrating a separator for a secondary battery to an embodiment. Referring to FIG. 1, the separator 10 for a secondary battery according to an embodiment includes a porous substrate 20 and a coating layer 30 disposed on one or both surfaces of the porous substrate 20.

The porous substrate 20 may be a substrate having a plurality of pores and commonly used in electrochemical devices. Non-limiting examples of the porous substrate 20 may be a polymer film formed of a polymer, or a mixture of two or more selected from polyolefin such as polyethylene, polypropylene, and the like, a polyester such as, polyacetal, polyamide, polyimide, polycarbonate, polyetheretherketone, polyaryletherketone, polyetherimide, polyamideimide, polybenzimidazole, polyethersulfone, polyphenyleneoxide, a cyclic olefin copolymer, polyphenylenesulfide, polyethylenenaphthalate, a glass fiber, Teflon, and polytetrafluoroethylene.

The porous substrate 20 may be for example a polyolefin-based substrate including polyolefin and the polyolefin-based substrate may improve has safety of a battery due to its improved shutdown function. The polyolefin-based substrate may be for example selected from a polyethylene single film, a polypropylene single film, a polyethylene/polypropylene double film, a polypropylene/polyethylene/polypropylene triple film, and a polyethylene/polypropylene/polyethylene triple film. In addition, the polyolefin-based resin may include a non-olefin resin in addition to an olefin resin or a copolymer of olefin and a non-olefin monomer.

The porous substrate 20 may have a thickness of about 1 μm to 40 μm, for example, 1 μm to 30 μm, 1 μm to 20 μm, 5 μm to 15 μm, or 5 μm to 10 μm.

The coating layer 30 includes a binder and inorganic particles to be described later.

The binder may play a role of fixing the inorganic particles on the porous substrate 20 and simultaneously, providing adhesion strength of well adhering one surface of the coating layer 30 to the porous substrate 20 and also, the other surface thereof to an electrode.

The binder includes a first fluorine-based binder and a second fluorine-based binder.

The first fluorine-based binder may include a vinylidene fluoride (VDF)-derived unit and a hexafluoropropylene (HFP)-derived unit.

For example, the first fluorine-based binder may be a copolymer composed of a vinylidene fluoride (VDF)-derived unit and a hexafluoropropylene (HFP) structural unit.

For example, the first fluorine-based binder may be in various forms such as an alternating polymer in which the vinylidene fluoride (VDF)-derived units and the hexafluoropropylene (HFP) structural units are alternately distributed, a random polymer in which the structural units are randomly distributed, a graft polymer in which some of the structural units are grafted, or the like. In addition, the first fluorine-based binder may be a linear polymer, a branched polymer, or a mixture thereof.

In the first fluorine-based binder, the hexafluoropropylene (HFP)-derived unit may be included in an amount of less than or equal to 5 mol %, for example, less than or equal to 3 mol % based on 100 mol % of the first fluorine-based binder.

The second fluorine-based binder may include a vinylidenefluoride (VDF)-derived unit and a tetrafluoroethylene (TFE)-derived unit.

For example, the second fluorine-based binder may be a copolymer composed of the vinylidene fluoride (VDF) structural unit and the tetrafluoroethylene (TFE) structural unit.

For example, the second fluorine-based binder may be in various forms such as an alternating polymer in which the vinylidene fluoride (VDF) structural units and the tetrafluoroethylene (TFE) structural units are alternately distributed, a random polymer in which the structural units are randomly distributed, a polymer in which some of the structural units are grafted, or the like. In addition, the second fluorine-based binder may be a linear polymer, a branched polymer, or a mixture thereof.

In the second fluorine-based binder, the tetrafluoroethylene (TFE)-derived unit may be included in an amount of greater than 10 mol % and less than or equal to 40 mol %, for example greater than 10 mol % and less than or equal to 30 mol % based on 100 mol % of the second fluorine-based binder.

When the hexafluoropropylene (HFP)-derived unit and the tetrafluoroethylene (TFE)-derived unit are respectively included within the ranges in the first fluorine-based binder and the second fluorine-based binder, a separator may secure an excellent binding force for a substrate and excellent adhesion strength to an electrode.

Particularly, when greater than 10 mol % and less than or equal to 40 mol % of the tetrafluoroethylene (TFE)-derived unit based on 100 mol % of the second fluorine-based binder is included in the second fluorine-based binder, excellent wet adhesion strength may not only be maintained, but also dry adhesion strength may be greatly improved. When the tetrafluoroethylene (TFE)-derived unit is included in an amount of less than 10 mol %, dry adhesion strength may be greatly deteriorated, resultantly, deteriorating the binding force for a substrate and thus quality of a secondary battery.

The first fluorine-based binder may be included in an amount of 55 wt % to 95 wt %, and the second fluorine-based binder, and the second fluorine-based binder may be included in an amount of 5 wt % to 45 wt %, based on the total amount of the first fluorine-based binder. For example, within the ranges, the first fluorine-based binder may be included in an amount of 60 wt % to 95 wt %, the second fluorine-based binder may be included in an amount of 5 wt % to 40 wt %, specifically, the first fluorine-based binder may be included in an amount of 60 wt % to 90 wt %, the second fluorine-based binder may be included in an amount of 10 wt % to 40 wt %, and in an embodiment, the first fluorine-based binder may be included in an amount of 70 wt % to 90 wt %, and the second fluorine-based binder may be included in an amount of 10 wt % to 30 wt %.

When the first fluorine-based binder is increased out of the range, the binding force for a substrate may be significantly deteriorated, resultantly deteriorating secondary battery performance, and when the second fluorine-based binder is increased out of the range, wet adhesion strength is significantly deteriorated, and simultaneously, air permeation time is increased.

In other words, when the first fluorine-based binder and the second fluorine-based binder are within the ranges, wet adhesion strength and dry adhesion strength are all maintained, accordingly, realizing excellent air permeability as well as maintaining excellent adhesion strength to an electrode and binding force for a substrate.

The first fluorine-based binder and the second fluorine-based binder may be respectively prepared in various methods such as emulsion polymerization, suspension polymerization, massive polymerization, solution polymerization, bulk polymerization, or the like, for example, suspension polymerization or emulsion polymerization.

On the other hand, the first fluorine-based binder may have a weight average molecular weight of 600,000 to 1,000,000 or less, and the second fluorine-based binder may have a weight average molecular weight of 800,000 to 1,300,000. In addition, within the range, the first fluorine-based binder may have a weight average molecular weight of 700,000 to 1,000,000 or less or 800,000 to 1,000,000 or less, and the second fluorine-based binder may have a weight average molecular weight of 800,000 to 1,200,000 or 900,000 to 1,200,000.

When the first fluorine-based binder and the second fluorine-based binder have a weight average molecular weight within the ranges, excellent adhesion strength may be obtained. The weight average molecular weight may be an average molecular weight, reduced to polystyrene, which is measured using gel permeation chromatography.

The first fluorine-based binder and the second fluorine-based binder may be included in an amount of 1 wt % to 30 wt %, for example, 5 wt % to 30 wt %, or 10 to 30 wt % based on the total amount of the coating layer 30. When the first fluorine-based binder and the second fluorine-based binder are used together within the ranges, the separator 10 for a secondary battery may have excellent adhesion strength.

The coating layer 30 includes the inorganic particles and exhibits improved heat resistance and thereby may prevent rapid contraction or deformation of the separator due to a temperature increase. The inorganic particles may be, for example, a ceramic material improving heat resistance, for example, metal oxides, semi-metal oxides, metal fluorides, metal hydroxides, or a combination thereof. The inorganic particles may include, for example, $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, or a combination thereof, but is not limited thereto.

In addition, the inorganic particles may have a spherical shape, a sheet shape, a cubic shape, or an amorphous shape. An average particle diameter of the inorganic particles may range from about 1 nm to 2500 nm, and within the range, about 100 nm to 2000 nm, or 100 nm to 1000 nm, for example about 300 nm to 800 nm. The average particle diameter of the inorganic particles may be particle size ($D_{50}$) at a volume ratio of 50% in a cumulative size-distribution curve. When the inorganic particles have an average particle diameter within the range, appropriate strength may be applied to the coating layer 30. The inorganic particles may be prepared by mixing two or more types with different sizes.

The inorganic particles may be used in an amount of greater than or equal to 70 wt %, for example, 70 wt % to 99 wt %, or 70 wt % to 90 wt % based on the total amount of the coating layer 30. When the inorganic particles are included within the ranges, the separator 10 for a secondary battery according to an embodiment may have improved heat resistance, durability, and stability.

The separator 10 for a secondary battery according to an embodiment includes the coating layer 30 including the aforementioned binder and inorganic particles and thus may exhibit excellent heat resistance, stability, wet adhesion strength, dry adhesion strength, and heat shrinkage.

The coating layer 30 may further include one or two or more additional binders in addition to the binders. The additional binder may include a crosslinked binder or a non-crosslinked binder.

The crosslinked binder may be obtained from a monomer, an oligomer, and/or a polymer having a curable functional group capable of reacting with heat and/or light, for example, a multi-functional monomer, a multi-functional oligomer, and/or a multi-functional polymer having at least two curable functional groups. The curable functional group may include a vinyl group, an epoxy group, an oxetane group, an ether group, a cyanate group, an isocyanate group, a hydroxy group, a carboxyl group, a thiol group, an amino group, an alkoxy group, or a combination thereof, but is not limited thereto.

For example, the crosslinked binder may be obtained from a monomer, an oligomer and/or a polymer including at least two epoxy groups, for example bisphenol A diglycidyl ether, bisphenol F diglycidyl ether, hexahydrophthalic acid glycidyl ester, or a combination thereof.

For example, the crosslinked binder may be obtained from a monomer, an oligomer and/or a polymer including at least two isocyanate groups, and may be, for example, obtained by curing diphenylmethane diisocyanate, 1,6-hexamethylene diisocyanate, 2,2,4-trimethylhexamethylene diisocyanate, phenylene diisocyanate, 4,4'-dicyclohexylmethane diisocyanate, 3,3'-dimethyldiphenyl-4,4'-diisocyanate, xylene diisocyanate, naphthalene diisocyanate, 1,4-cyclohexyl diisocyanate, or a combination thereof.

The non-crosslinked binder may be, for example, polymethyl methacrylate, polyacrylonitrile, polyvinylpyrrolidone, polyvinylacetate, a polyethylene-vinylacetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, an acrylonitrile-styrene-butadiene copolymer, or a combination thereof, but is not limited thereto.

The coating layer 30 may have a thickness of about 0.01 μm to 20 μm, within the range, about 1 μm to 10 μm or about 1 μm to 5 μm.

The separator 10 for secondary battery may be manufactured by known various methods. For example, the separator 10 for a secondary battery may be formed by coating a composition for forming a coating layer and drying and curing the same on one surface or both surfaces of the porous substrate 20. The composition for forming the coating layer may include the first fluorine-based binder, the second fluorine-based binder, inorganic particles, and a solvent.

The solvent is not particularly limited as long as it can dissolve or disperse the first fluorine-based binder, the second fluorine-based binder, and inorganic particles.

The coating may be performed by, for example, a spin coating, a dip coating, a bar coating, a die coating, a slit coating, a roll coating, an ink jet printing, or the like, but is not limited thereto.

The drying may be performed under a humidified atmosphere through, for example, natural drying, drying with warm air, hot air, or low wet air, vacuum drying, irradiation of far infrared rays or electron beam, but is not limited thereto. For example, the drying may be performed at a temperature of 25° C. to 120° C.

The separator 10 for a lithium secondary battery may be manufactured by lamination, coextrusion, and the like in addition to the above method.

Hereinafter, a lithium secondary battery including the aforementioned separator for a lithium secondary battery is described.

A lithium secondary battery may be classified into a lithium ion battery, a lithium ion polymer battery, and a lithium polymer battery depending on kinds of a separator and an electrolyte. It also may be classified to be cylindrical, prismatic, coin-type, pouch-type, and the like depending on shapes. In addition, it may be bulk type and thin film type depending on sizes. Structures and manufacturing methods for these batteries pertaining to this disclosure are well known in the art.

Here, an example of a lithium secondary battery is described with reference to FIG. 2. FIG. 2 is an exploded perspective view showing a lithium secondary battery according to an embodiment. Referring to FIG. 2, a lithium secondary battery 100 according to one embodiment includes an electrode assembly 60 manufactured by disposing a separator 10 between a positive electrode 40 and a negative electrode 50 and winding them, and a case 70 housing the electrode assembly 60.

The electrode assembly 60 may have for example a jelly-roll shape formed by winding the positive electrode 40, the negative electrode 50, and the separator 10 disposed therebetween.

The case may be cylindrical, prismatic, thin film, polymer, or the like. For example, the lithium secondary battery may be a polymer type battery.

The positive electrode 40, the negative electrode 50, and the separator 10 are impregnated in an electrolyte solution (not shown).

The positive electrode 40 includes a positive current collector and a positive active material layer formed on the positive current collector. The positive active material layer includes a positive active material, a binder, and optionally a conductive material.

The positive current collector may use aluminum, nickel, and the like, but is not limited thereto.

The positive active material may use a compound being capable of intercalating and deintercalating lithium. Specifically, at least one of a composite oxide or a composite phosphate of a metal selected from cobalt, manganese, nickel, aluminum, iron, or a combination thereof and lithium may be used. For example, the positive active material may be lithium cobalt oxide, lithium nickel oxide, lithium manganese oxide, lithium nickel cobalt manganese oxide, lithium nickel cobalt aluminum oxide, lithium iron phosphate, or a combination thereof.

The binder serves to adhere the positive active material particles to each other as well as to adhere the positive active material to the positive current collector, and specific examples of the binder may include polyvinylalcohol, carboxylmethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto. These may be used alone or as a mixture of two or more.

The conductive material imparts conductivity to an electrode. Examples thereof may be natural graphite, artificial graphite, carbon black, a carbon fiber, a metal powder, a metal fiber, and the like, but are not limited thereto. These may be used alone or as a mixture of two or more. The metal powder and the metal fiber may use a metal of copper, nickel, aluminum, silver, and the like.

The negative electrode 50 includes a negative current collector and a negative active material layer formed on the negative current collector.

The negative current collector may use copper, gold, nickel, a copper alloy, and the like, but is not limited thereto.

The negative active material layer may include a negative active material, a binder, and optionally a conductive material. The negative active material may be a material that reversibly intercalates/deintercalates lithium ions, a lithium metal, a lithium metal alloy, a material capable of doping and dedoping lithium, a transition metal oxide, or a combination thereof.

The material that reversibly intercalates/deintercalates lithium ions may be a carbon material which is any generally-used carbon-based negative active material, and examples thereof may be crystalline carbon, amorphous carbon, or a combination thereof. Examples of the crystalline carbon may be graphite such as amorphous, plate-shape, flake, spherical shape or fiber-shaped natural graphite or artificial graphite. Examples of the amorphous carbon may be soft carbon or hard carbon, a mesophase pitch carbonized product, fired coke, and the like. The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn. The material capable of doping and dedoping lithium may be Si, $SiO_x$ (0<x<2), a Si—C composite, a Si—Y alloy, Sn, $SnO_2$, a Sn—C composite, a Sn—Y alloy, and the like, and at least one of these may be mixed with $SiO_2$. The element Y may be selected from Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof. The transition metal oxide may be vanadium oxide, lithium vanadium oxide, and the like.

The types of the binder and conductive material used in the negative electrode 50 are the same as the binder and conductive material described for the positive electrode.

The positive electrode 40 and the negative electrode 50 may be manufactured by mixing each active material composition including each active material and a binder, and optionally a conductive material in a solvent, and coating the active material composition on each current collector. Herein, the solvent may be N-methylpyrrolidone, and the like, but is not limited thereto. The electrode manufacturing method is well known, and thus is not described in detail in the present specification.

The electrolyte solution includes an organic solvent a lithium salt.

The organic solvent serves as a medium for transporting ions taking part in the electrochemical reaction of a battery. The organic solvent may be, for example, a carbonate-based solvent, an ester-based solvent, an ether-based solvent, a ketone-based solvent, an alcohol-based solvent, and an aprotic solvent. The carbonate-based solvent may be dimethylcarbonate, diethylcarbonate, dipropylcarbonate, methylpropylcarbonate, ethylpropylcarbonate, methylethylcarbonate, ethylenecarbonate, propylenecarbonate, butylenecarbonate, and the like and the ester-based solvent may be methylacetate, ethylacetate, n-propylacetate, 1,1-dimethylethylacetate, methylpropionate, ethylpropionate, γ-butyrolactone, decanolide, γ-valerolactone, mevalonolactone, caprolactone, and the like. The ether-based solvent may be dibutylether, tetraglyme, diglyme, dimethoxyethane, 2-methyltetrahydrofuran, tetrahydrofuran, and the like and the ketone-based solvent may be cyclohexanone, and the like. The alcohol-based solvent may be ethanol, isopropyl alcohol, and the like, and the aprotic solvent may be nitriles such as R—CN (R is a C2 to C20 linear, branched, or cyclic hydrocarbon group, a double bond, an aromatic ring, or an ether bond), and the like, amides such as dimethyl formamide, dioxolanes such as 1,3-dioxolane, sulfolanes, and the like.

The organic solvent may be used alone or in a mixture of two or more, and when the organic solvent is used in a mixture of two or more, the mixture ratio may be controlled in accordance with a desirable cell performance.

The lithium salt is dissolved in an organic solvent, supplies lithium ions in a battery, basically operates the lithium secondary battery, and improves lithium ion transportation between positive and negative electrodes therein. Examples of the lithium salt may include $LiPF_6$, $LiBF_4$, $LiSbF_6$, $LiAsF_6$, $LiN(SO_3C_2F_5)_2$, $LiN(CF_3SO_2)_2$, $LiCl_4F_9SO_3$, $LiClO_4$, $LiAlO_2$, $LiAlCl_4$, $LiN(C_xF_{2x+1}SO_2)(C_yF_{2y+1}SO_2)$, wherein x and y are natural numbers, LiCl, LiI, $LiB(C_2O_4)_2$, or a combination thereof, but are not limited thereto.

The lithium salt may be used in a concentration ranging from 0.1 M to 2.0 M. When the lithium salt is included within the above concentration range, an electrolyte may have excellent performance and lithium ion mobility due to optimal electrolyte conductivity and viscosity.

MODE FOR INVENTION

Hereinafter, the above aspects of the present disclosure are illustrated in more detail with reference to examples. However, these examples are exemplary, and the present disclosure is not limited thereto.

EXAMPLES AND COMPARATIVE EXAMPLES: PREPARATION OF SEPARATOR AND ELECTRODE ASSEMBLY

Example 1

(1) Preparation of Separator

A PVdF-HFP copolymer having a weight average molecular weight of 850,000 (a mole ratio of PVdF:HFP=98:2, a glass transition temperature: −30° C., a melting point: 150° C.) was added to acetone at 10 wt % and then, stirred at 45° C. for 3 hours, preparing a first fluorine-based binder solution.

In addition, a PVdF-TFE copolymer having a weight average molecular weight of 1,000,000 (a mole ratio of PVdF:TFE=70:30, a melting point: 130° C.) was added to acetone at 10 wt % and then, stirred at 45° C. for 3 hours, preparing a second fluorine-based binder solution.

On the other hand, inorganic dispersion was prepared by adding alumina ($Al_2O_3$) (LS-71A, Nippon Metal Co., Ltd.) to acetone at 25 wt % and milling the mixture at 25° C. for 4 hours.

The first fluorine-based binder solution and the second fluorine-based binder solution were mixed in a weight ratio of 8:2, and then, this binder mixed solution was mixed with the inorganic dispersion in a weight ratio of 1:3 and then, stirred with a power mixer at 25° C. for 2 hours, preparing a composition for forming a coating layer.

The composition for forming a coating layer was coated to be 1.5 μm thick (3.0 μm thick in total) on each one of both surfaces of a 7.0 μm-thick polyethylene film (PE, SK Innovation Co., Ltd.) in a Direct metering method (direct quantification) at 20 m/min and then, dried at 50° C. in the presence of an absolute aqueous vapor content of 11 g/m³ (on average), manufacturing a separator for a secondary battery.

(2) Preparation of Electrode Assembly $LiCoO_2$, polyvinylidene fluoride, and carbon black in a weight ratio of 96:2:2 were added to an N-methylpyrrolidone solvent to prepare slurry. The slurry was coated on an aluminum thin film and then, dried and compressed to manufacture a positive electrode.

In addition, graphite, polyvinylidene fluoride, and carbon black in a weight ratio of 98:1:1 were added to an N-methylpyrrolidone solvent to prepare slurry. The slurry was coated on a copper foil and then, dried and compressed to manufacture a negative electrode.

The prepared separator was disposed between the positive electrode and the negative electrode and then, wound together to form a jelly-roll electrode assembly. Subsequently, an electrolyte solution prepared by adding 1.15 M of $LiPF_6$ to a mixed solvent of ethylene carbonate, ethylmethyl carbonate, and diethyl carbonate in a volume ratio of 3:5:2 was injected thereto and then, sealed to manufacture a lithium secondary battery cell.

Example 2

A separator for a secondary battery and an electrode assembly were manufactured according to the same method as Example 1 except that the drying was performed in the presence of an absolute aqueous vapor content of 16 g/m³ (on average).

Example 3

A separator for a secondary battery and an electrode assembly were manufactured according to the same method as Example 1 except that the first fluorine-based binder solution and the second fluorine-based binder solution were mixed in a weight ratio of 7:3.

Example 4

A separator for a secondary battery and an electrode assembly were manufactured according to the same method as Example 3 except that the drying was performed in the presence of an absolute aqueous vapor content of 16 g/m³ (on average).

Comparative Example 1

A separator for a secondary battery and an electrode assembly were manufactured according to the same method as Example 1 except that a PVdF-TFE copolymer having a mole ratio of PVdF:TFE=90:10 was used.

Comparative Example 2

A separator for a secondary battery and an electrode assembly were manufactured according to the same method as Example 1 except that a PVdF-TFE copolymer having a mole ratio of PVdF:TFE=95:5 was used.

Comparative Example 3

A separator for a secondary battery and an electrode assembly were manufactured according to the same method as Example 1 except that the first fluorine-based binder solution alone was used without using the second fluorine-based binder (the weight ratio of the first fluorine-based binder solution and the second fluorine-based binder solution was 100:0).

Comparative Example 4

A separator for a secondary battery and an electrode assembly were manufactured according to the same method as Comparative Example 3 except that the drying was performed in the presence of an absolute aqueous vapor content of 16 g/m$^3$ (on average).

Comparative Example 5

A PVdF-HFP copolymer having a weight average molecular weight of 850,000 (a mole ratio of PVdF:HFP=98:2, a glass transition temperature: −30° C., a melting point: 150° C.) was added to acetone at 10 wt % and then, stirred at 45° C. for 3 hours with a stirrer, preparing a first fluorine-based binder solution.

In addition, a PVdF-HFP copolymer having a weight average molecular weight of 1,000,000 (a mole ratio of PVdF:HFP=93:7, a melting point: 156° C.) was added to acetone at 10 wt % and then, stirred at 45° C. for 3 hours with a stirrer, preparing a third fluorine-based binder solution.

On the other hand, inorganic dispersion was prepared by adding alumina (Al$_2$O$_3$) (LS-71A, Nippon Light Metal Co., Ltd.) to acetone at 25 wt % and milling the mixture with bead mills at 25° C. for 4 hours.

The first fluorine-based binder solution and the third fluorine-based binder solution were mixed in a weight ratio of 8:2, and this binder mixed solution was mixed with the inorganic dispersion in a weight ratio of 1:3 and then, stirred with a power mixer at 25° C. for 2 hours, preparing a composition for forming a coating layer.

The composition for forming a coating layer was coated to be 1.5 μm thick (3.0 μm in total) on each surface of both surfaces of a 7.0 μm-thick polyethylene film (PE, SK Innovation Co., Ltd.) in a Direct metering method (direct quantification) at 20 m/min and then, dried at 50° C. in the presence of an absolute aqueous vapor content of 11 g/m$^3$ (on average), preparing a separator for a secondary battery.

Comparative Example 6

A separator for a secondary battery and an electrode assembly were prepared according to the same method as Comparative Example 5 except that the drying was performed in the presence of an absolute aqueous vapor content of 16 g/m$^3$ (on average).

Each composition of the compositions for forming a coating layer according to Examples 1 to 4 and Comparative Examples 1 to 6 is shown in Table 1.

TABLE 1

| Binder Composition | First fluorine-based binder PVdF-HFP copolymer (mole ratio) | | Second fluorine-based binder PVdF-TFE copolymer (mole ratio) | | Third fluorine-based binder PVdF-HFP copolymer (mole ratio) | | Mixing weight ratio of binder | Humidifying condition (absolute aqueous vapor content |
|---|---|---|---|---|---|---|---|---|
| Structural unit | VdF | HFP | VdF | TFE | VdF | HFP | (wt %) | g/m$^3$) |
| Example 1 | 98 | 2 | 70 | 30 | — | | 80:20 | 11 |
| Example 2 | 98 | 2 | 70 | 30 | — | | 80:20 | 16 |
| Example 3 | 98 | 2 | 70 | 30 | — | | 70:30 | 11 |
| Example 4 | 98 | 2 | 70 | 30 | — | | 70:30 | 16 |
| Comparative Example 1 | 98 | 2 | 90 | 10 | — | | 80:20 | 11 |
| Comparative Example 2 | 98 | 2 | 95 | 5 | — | | 80:20 | 11 |
| Comparative Example 3 | 98 | 2 | — | | — | | 100:0 | 11 |
| Comparative Example 4 | 98 | 2 | — | | — | | 100:0 | 16 |
| Comparative Example 5 | 98 | 2 | — | | 93 | 7 | 80:20 | 11 |
| Comparative Example 6 | 98 | 2 | — | | 93 | 7 | 80:20 | 16 |

EVALUATION EXAMPLES

Evaluation Example 1: Measurement of Air Permeability

The separators of Examples 1 to 4, and Comparative Examples 1 to 6 were evaluated by measuring time (second) taken for air of 100 cc to permeate each of them with an air permeability-measuring device (EG01-55-1MR, Asahi Seiko Co., Ltd.) and the results are shown in Table 2.

Evaluation Example 2: Evaluation of Bending Force

A three-point bending force test was performed to evaluate adhesive strength between electrodes and separator by using UTM. The cells according to Examples 1 to 4 and Comparative Examples 1 to 6 were respectively manufactured to have a size of L (93.1 mm)×W (38 mm)×H (3.5 mm), fixed in a length direction on a lower jig, pressed at 5 mm/min under a predetermined load (a maximum load: 1 Kn), and then, measured with respect to a force at a moment when the cells were deformed. The higher the bending force, the higher the adhesion strength between the electrode and the separator. The evaluation was performed in the state of discharging the cells at 3.0 V after completing the initial one cycle. The measured results are shown in Table 2.

Evaluation Example 3: Evaluation of Adhesion Strength

A tape with a width of 12 mm and a length of 150 mm was attached to the separators according to Examples 1 to 4 and Comparative Examples 1 to 6 and then, uniformly compressed with a hand roller. The separators with the tape were cut into a size extended to 2.0 mm in each length and width of the tape, preparing samples.

After separating the tape side of each separator from the substrate by about 10 mm to 20 mm and fixing the non-tape side to an upper grip, while the coating layer side with the tape to a lower grip, with a gap of 20 mm between the grips, both of the sides were pulled in a 180° direction for peeling by using UTM (Instron). Herein, the peeling was performed at 20 mm/min, and a force for the peeling was 3 times measured and averaged, obtaining an average force required to peel 40 mm off after starting the peeling. The results are shown in Table 2.

TABLE 2

| | Coating thickness (μm) | Air permeation time (sec/100 cc) | Bending force (N) | Binding force for substrate (N, 12 mm) |
|---|---|---|---|---|
| Example 1 | 3.0 | 82 | 460 | 2.4 |
| Example 2 | 3.0 | 65 | 491 | 2.1 |
| Example 3 | 3.0 | 79 | 410 | 2.2 |
| Example 4 | 3.0 | 63 | 456 | 1.9 |
| Comparative Example 1 | 3.0 | 58 | 468 | 1.1 |
| Comparative Example 2 | 3.0 | 55 | 485 | 0.8 |
| Comparative Example 3 | 3.0 | 65 | 510 | 0.5 |
| Comparative Example 4 | 3.0 | 51 | 516 | 0.2 |
| Comparative Example 5 | 3.0 | 57 | 489 | 0.6 |
| Comparative Example 6 | 3.0 | 45 | 505 | 0.2 |

Referring to Table 2, the separators of Examples 1 to 4 using the first fluorine-based binder including less than or equal to 5 mol % of a hexafluoropropylene (HFP)-derived unit and the second fluorine-based binder including greater than 10 mol % and less than or equal to 40 mol % of a tetrafluoroethylene (TFE)-derived unit maintained an excellent binding force for a substrate and exhibited stable air permeability and bending strength. Particularly, the separators of Examples 2 and 4 realized excellent wet adhesion strength, that is, an excellent binding force for a substrate under a humidifying condition in which the absolute water vapor content was increased.

In contrary, the separators of Comparative Examples 1 and 2 using the second fluorine-based binder including less than or equal to 10 mol % of the tetrafluoroethylene (TFE)-derived unit, the separators of Comparative Examples 3 and 4 using no second fluorine-based binder, and the separators of Comparative Examples 5 and 6 using the third fluorine-based binder including the hexafluoropropylene (HFP)-derived unit instead of the tetrafluoroethylene (TFE)-derived unit exhibited a greatly deteriorated binding force for a substrate, and the separator of Comparative Example 4 using no second fluorine-based binder exhibited a much deteriorated binding force for a substrate under a humidifying condition in which an absolute aqueous vapor content was increased.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

The invention claimed is:

1. A separator for a secondary battery, the separator comprising:
    a porous substrate; and
    a coating layer disposed on at least one surface of the porous substrate,
    wherein:
    the coating layer includes:
        a first fluorine-based binder including a vinylidene fluoride (VDF)-derived unit and a hexafluoropropylene (HFP)-derived unit, and
        a second fluorine-based binder consisting of a vinylidene fluoride (VDF)-derived unit and a tetrafluoroethylene (TFE)-derived unit,
    the hexafluoropropylene (HFP)-derived unit is included in an amount of less than or equal to 3 mol %, based on 100 mol % of the first fluorine-based binder,
    the tetrafluoroethylene (TFE)-derived unit is included in an amount of greater than 10 mol % and less than or equal to 30 mol %, based on 100 mol % of the second fluorine-based binder, and
    the first fluorine-based binder is included in an amount of 70 wt % to 90 wt % and the second fluorine-based binder is included in an amount of 10 wt % to 30 wt %, based on a total weight of the first fluorine-based binder and the second fluorine-based binder.

2. The separator of claim 1, wherein the coating layer further comprises inorganic particles.

3. The separator of claim 2, wherein the inorganic particles are included in an amount of 70 wt % to 99 wt %, based on a total weight of the coating layer.

4. The separator of claim 2, wherein the inorganic particles include $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, or a combination thereof.

5. The separator of claim 1, wherein:
    a weight average molecular weight of the first fluorine-based binder is 600,000 to 1,000,000, and a weight average molecular weight of the second fluorine-based binder is 800,000 to 1,500,000.

6. The separator of claim 1, wherein a thickness of the coating layer is 1 μm to 5 μm.

7. A lithium secondary battery, comprising:
a positive electrode,
a negative electrode, and
the separator for a secondary battery of claim 1 between the positive electrode and the negative electrode.

* * * * *